Nov. 14, 1939.   C. F. SCHNUCK   2,179,961
RUBBER MILL OR THE LIKE
Filed April 15, 1937   3 Sheets-Sheet 1

Inventor
Carl F. Schnuck
By Rockwell Bachelow
Attorneys

Nov. 14, 1939.   C. F. SCHNUCK   2,179,961
RUBBER MILL OR THE LIKE
Filed April 15, 1937   3 Sheets-Sheet 2
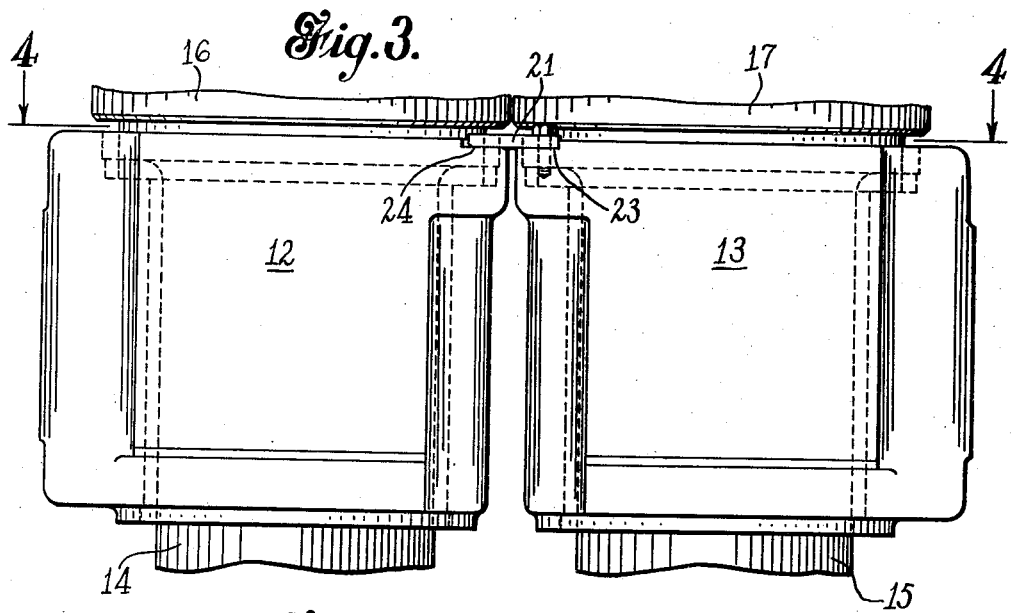
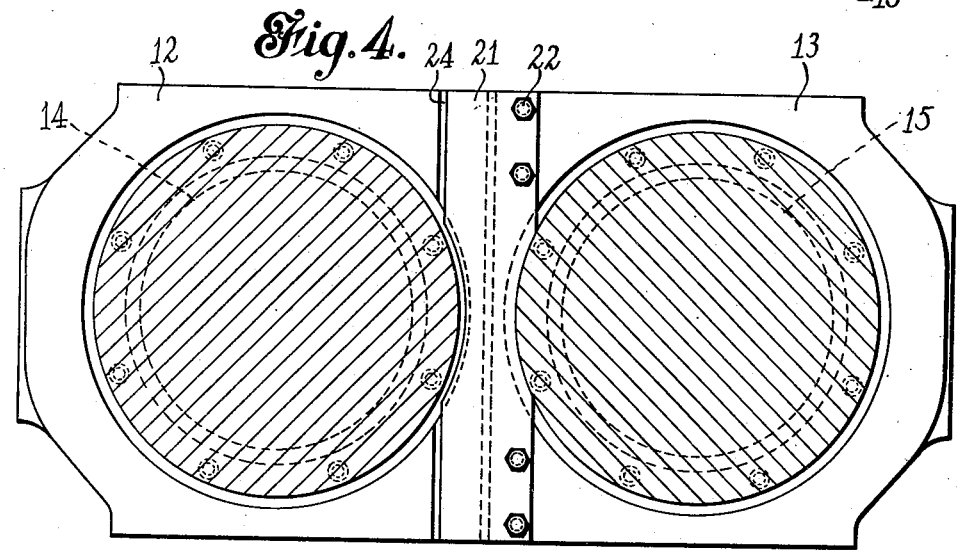
Inventor
Carl F. Schnuck
By Rockwell & Bartholow
Attorneys

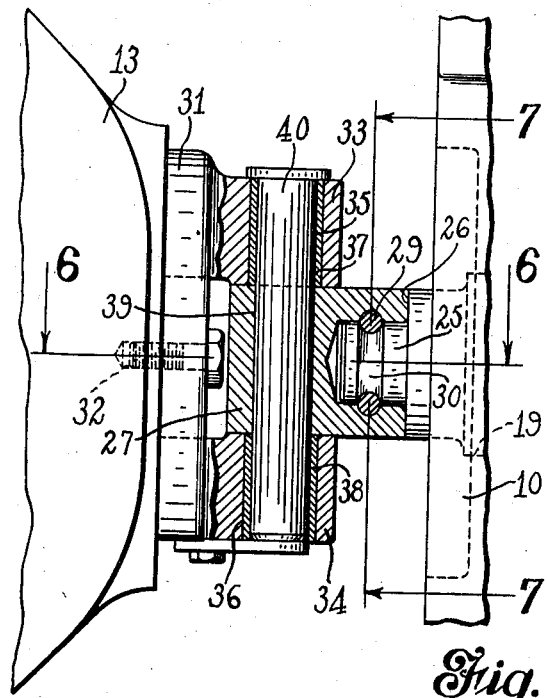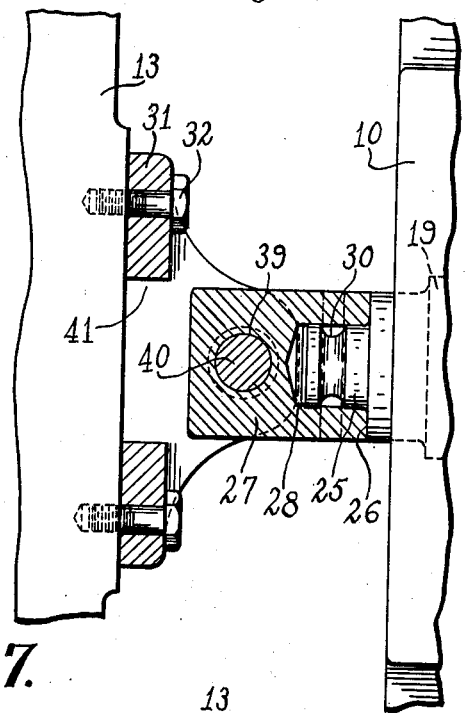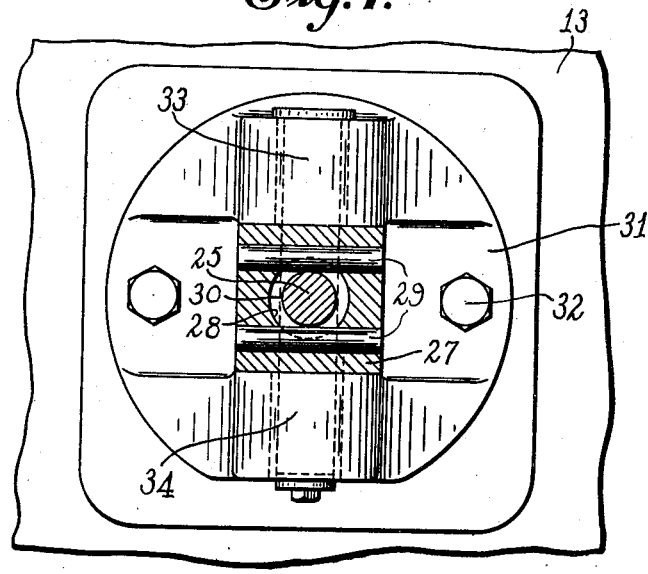

Patented Nov. 14, 1939

2,179,961

UNITED STATES PATENT OFFICE 2,179,961

RUBBER MILL OR THE LIKE

Carl F. Schnuck, New Haven, Conn., assignor to Farrel-Birmingham Company, Inc., Ansonia, Conn., a corporation of Connecticut Application April 15, 1937, Serial No. 137,127

11 Claims. (Cl. 18—2)

This invention relates to improvements in journal boxes, and more particularly to improvements in journal boxes for rubber mills or similar devices.

Rubber mills employed for breaking down crude rubber normally comprise a pair of oppositely driven rolls placed in horizontal alignment, the rubber stock being fed between the rolls through the bite of which it passes again and again until the breaking down process has been completed. According to usual practice, one of the rolls, generally the rear roll, is driven at a greater speed than the front roll, which causes the stock to cling to the front roll, where it is accessible to the operator. Also, it is common practice to support at least one of the rolls in movable or adjustable journal boxes, so that this roll may be adjusted relatively to the other to adjust the roll bite as required.

As the rubber stock passes between the rolls, it is often caused to move outwardly toward the roll necks. To minimize this effect, stock guides are employed adjacent the ends of the rolls, which tend to hold the stock in place, and between such guides joint strips are placed to further close the opening at the roll ends. However, particularly when the rolls are adjusted and the opening between them increased, it is impossible to completely close this space at the ends by use of such guides and it frequently occurs that the rubber stock will be squeezed out beyond the ends of the rolls and between the journal boxes within which the roll necks are journaled, at times causing considerable difficulty as it may enter the gear boxes or gears disposed on the ends of the roll necks to such an extent that it becomes necessary to stop the machine and remove such stock.

In providing adjusting means to adjust the roll bite it is usual to provide an adjusting screw having a mounting in a part of the frame of the device, which screw has a bearing upon one of the journal boxes or upon a block or cap, which in turn is secured to, or has a bearing against, the journal box, such arrangement being provided, of course, in each end of the adjustable roll. It sometimes occurs that the necks of the rolls do not always remain in a position in which their axes are exactly at right angles to the adjusting screws, and in this event the bearing blocks or caps either do not bear flatly against the journal boxes or do not bear flatly against the ends of the adjusting screws. Also it is advantageous to provide means for relieving the pressure upon the rolls in case this pressure becomes excessive, in order that the rolls themselves will not be caused to give way. To these ends, I have provided in the present structure a hinge or knuckle joint in the connection between the pin screw and the journal boxes and also have provided an arrangement whereby a pin or like shearing member will be positively sheared off to relieve the pressure upon the rolls when this pressure reaches a given amount, so as to permit the rolls to spread.

One object of the present invention is the provision of journal boxes provided with means effectively closing the space between such boxes at all times to prevent the rubber stock from being crowded into the space between these boxes.

A still further object of the invention is the provision of relatively adjustable journal boxes for the rolls of rubber mills or the like, these journal boxes being provided with means effectively closing the space between them regardless of their position of adjustment to prevent the material being acted upon by the rolls from working out between the journal boxes and causing inconvenience in the operation of the machine.

Still another object of the invention is to provide a hinge or swivel connection between the adjusting screw and the journal boxes to provide for any angular misalignment of the roll necks and also to provide a shearing member which will be positively sheared off or give way when the pressure upon the rolls reaches a given amount.

To these and other ends the invention consists in the novel features and combinations of parts to be hereinafter described and claimed.

In the drawings:

Fig. 3 is a plan view of the journal boxes and the ends of the rolls, and

Fig. 4 is a sectional view on line 4—4 of Fig. 3;

Fig. 5 is a fragmentary sectional view on line 5—5 of Fig. 2;

Fig. 6 is a sectional view on line 6—6 of Fig. 5;

Fig. 7 is a sectional view on line 7—7 of Fig. 5.

Figure 1:
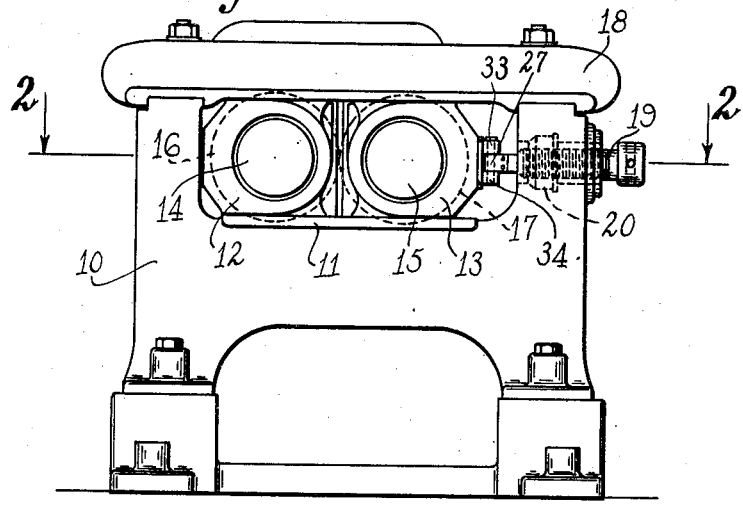
Fig. 1 is an end elevational view of a rubber mill embodying my improvements.

To show a preferred embodiment of my invention, I have illustrated a rubber mill comprising an end frame 10 providing a bed for the journal boxes 12 and 13, within which are journaled the roll necks 14 and 15 provided upon the operating rolls 16 and 17. It will be understood that the roll necks 14 and 15 extend outwardly from the journal boxes so as to be provided with suitable driving gears or pinions (not shown.)

The journal boxes are held in place by the cap 18, and, as shown, the journal box 13 is adjustable relatively to its mate so that the bite between the rolls may be adjusted. It will, of course, be understood that the rolls are provided with similarly constructed journal boxes at both ends thereof, it being only necessary, however, to illustrate one end of the machine. The box 13 is held in adjusted position by the screw 19, which is suitably threaded in a gland or nut 20 supported by the frame 10.

Figure 2:
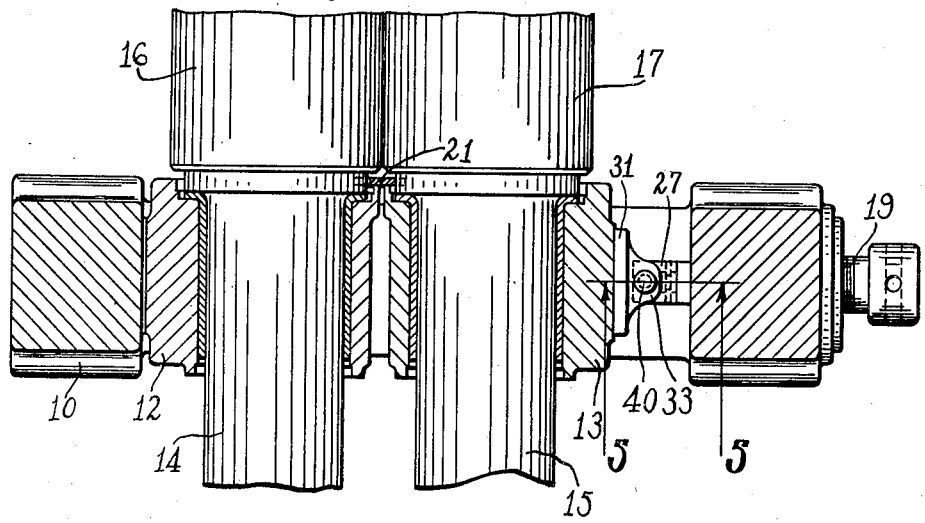
Fig. 2 is a sectional view of the journal boxes and roll necks journaled therein taken on line 2—2 of Fig. 1.

It will be apparent that even if the adjacent surfaces of the journal boxes 12 and 13 are in contact or substantially in contact when the roll surfaces are placed close together or iron to iron, there will always be a certain space between these boxes when the space between the rolls is increased, that is, when the roll 17 is moved toward the right in Fig. 2, as permitted by the adjusting screw 19. It is this space between the journal boxes that has in the past given trouble, in that it permits the rubber stock to be forced out between the journal boxes and interfere with the driving gears or pinions on the roll necks.

In order to prevent such an occurrence, I have provided a sealing member which will effectually close this opening between the journal boxes regardless of their adjustment. As one means of effecting this result, I have shown a strip or plate 21 secured to one of the journal boxes, in this case the movable journal box 13, by means of bolts or screws 22. As shown in Fig. 4, this strip extends throughout the depth of the journal boxes and is of sufficient width to lap over the adjacent edge of the other journal box so as to close the intervening space. The strip or plate 21 is secured, however, to one only of the boxes so that it will not interfere with the relative lateral adjustment thereof, will in all adjusted positions effectively seal the intervening space so as to prevent any of the stock being crowded into this space.

As shown more especially in Fig. 3, the inner faces of the journal boxes adjacent the contacting edges are rabbetted or cut away, as illustrated at 23 and 24, so that the sealing plate 21 is "let in" to these boxes in order that the inner surface of the plate be substantially flush with the inner surface of the boxes, so that no change will be necessary in the length of the roll surfaces.

From inspection of Fig. 3, it will be evident that any of the rubber stock being acted upon by the rolls which may be crowded out beyond the ends of the active surfaces of the rolls will strike the plate or strip 21, and its progress in an endwise direction will be stopped. It will, therefore, tend to be carried about the roll with the other stock, so as to pass again through the roll bite as it is desired.

The adjusting screw 19 is threadedly mounted in the nut 20 as described, which nut is supported by the frame 10. The projecting end of this screw is reduced in size as shown at 25 to provide a shoulder 26 and on the reduced end of the screw is rotatably mounted a block 27 having a rearwardly facing opening 28 within which the reduced end 25 of the screw is received. A pair of pins 29 may be driven through the block 27, which pins project into an annular groove 30 in the member 25 to prevent longitudinal movement between the block and screws and at the same time permit rotative movement between these two parts.

A plate 31 is secured to the journal box 13 by means of screws 32 and this plate is provided with knuckles 33 and 34 having aligned openings 35 and 36, within which may be provided hardened bushings 37 and 38. Through the opening in these knuckles and through an opening 39 provided in the block 27 is inserted a hinge pin 40, which in this instance acts as the shearing member. It will be understood that the block 27 is received between the knuckles 33 and 34 with a relatively close fit, so that when the rolls are subjected to an excessive pressure the pin 40 will be sheared off cleanly along the planes between the surfaces of the block 27 and the knuckles 33 and 34. This permits the rolls to spread, as there is a certain amount of clearance space between the end of the block 27 and the journal box 13, and the plate being provided with a central opening 41 for this purpose.

It will be apparent that the swivel or hinged joint, provided by the pin 40, will permit a varying angular position of the adjacent roll neck, and at the same time will permit pressure to be applied to the journal box through the full section of the pin 40. The rotatable connection between the cap 27 and the screw 19 permits rotational adjustment of the screw when the block is held by the pin 40.

While I have shown and described a preferred embodiment of my invention, it will be understood that it is not to be limited to all of the details shown, but is capable of modification and variation within the spirit of the invention and within the scope of the appended claims.

What I claim is:

1. A rubber mill or the like comprising a pair of co-acting rolls, journal boxes supporting said rolls at the ends thereof, and a member bridging the adjacent edges of said journal boxes to close the space there between, said member being secured to one of said boxes but free of attachment to the other thereof.

2. A rubber mill or the like comprising a pair of co-acting rolls having necks at the ends thereof, journal boxes in which the necks of said rolls are journaled, said boxes being relatively adjustable, and a sealing strip carried by one of each pair of said boxes and extending over the adjacent edge of the other box to bridge the space therebetween, said strip being free of attachment to the second box.

3. A rubber mill or the like comprising a pair of co-acting rolls, each having a neck at one end thereof, journal boxes in which said roll necks are journaled, one of each pair of said boxes being adjustable relatively to the other, said boxes being recessed along their adjacent edges at the inner faces thereof, and a sealing strip secured to one of each pair of said boxes and disposed in said recess and extending into the recess in the other box to close the space therebetween.

4. A rubber mill or the like comprising a pair of co-acting rolls, each having a neck at one end thereof, journal boxes in which said roll necks are journaled, one of each pair of said boxes being adjustable relatively to the other, said boxes being recessed along their adjacent edges at the inner faces thereof, and a sealing strip secured to one of each pair of said boxes and disposed in said recess and extending into the recess in the other box to close the space therebetween, said strip being adjustable relatively to one of said boxes with the box to which it is secured.

5. A rubber or like mill having a pair of cooperating rolls, a suitably mounted adjusting screw, a member to apply pressure from said adjusting screw on the neck of one of said rolls, and means to transmit pressure from said adjusting screw to said member, said means comprising an element rotatably connected to said screw and hingedly connected to said member.

6. A rubber or like mill having a pair of cooperating rolls, a suitably mounted adjusting screw, a member to apply pressure from said adjusting screw on the neck of one of said rolls, and an element through which the pressure is transmitted from said screw to said member, said element being rotatably connected to the screw and hingedly connected to said member.

7. A rubber or like mill having a pair of cooperating rolls, a member through which pressure may be applied upon the neck of one of said rolls, a suitably mounted adjusting screw, an element rotatably connected thereto, and a pin hingedly connecting said element to said member to transmit pressure from said adjusting screw upon said member.

8. A rubber or like mill having a pair of cooperating rolls, a member through which pressure may be applied upon the neck of one of said rolls, a suitably mounted adjusting screw, an element rotatably connected thereto, and a pin hingedly connecting said element to said member to transmit pressure thereto from said adjusting screw, said member and said element carrying cooperating knuckles through which said pin passes.

9. A rubber or like mill having a pair of cooperating rolls, a member through which pressure may be applied upon the neck of one of said rolls, a suitably mounted adjusting screw, an element rotatably connected thereto, and a pin hingedly connecting said element to said member to transmit pressure to said member from said adjusting screw, said member and said element carrying cooperating knuckles through which said pin passes and by which said pin may be sheared off under excessive pressure.

10. In a rubber or like mill, a roll, a member bearing against said roll and adapted to exert pressure thereon, a suitably mounted adjusting screw, an element rotatably connected to said screw, and a frangible pin hingedly connecting said element and said member through which pressure is transmitted to the latter from said screw.

11. In a rubber or like mill, a pair of cooperating rolls, a member adapted to exert pressure upon one of said rolls, a suitably mounted adjusting screw, an element rotatably connected to said screw, cooperating knuckles on said element and member, and a frangible pin mounted in said knuckles to transmit pressure from said adjusting screw to said member.

CARL F. SCHNUCK.